(12) United States Patent
Akaike et al.

(10) Patent No.: US 10,343,557 B2
(45) Date of Patent: *Jul. 9, 2019

(54) VEHICLE SEAT

(71) Applicant: TOYOTA BOSHOKU KABUSHIKI KAISHA, Aichi-ken (JP)

(72) Inventors: Fumitoshi Akaike, Aichi-ken (JP); Koji Kaneda, Aichi-ken (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/280,147

(22) Filed: Sep. 29, 2016

(65) Prior Publication Data

US 2017/0096084 A1   Apr. 6, 2017

(30) Foreign Application Priority Data

Oct. 1, 2015   (JP) .................................. 2015-196005

(51) Int. Cl.
*B60N 2/22* (2006.01)
*B64D 11/06* (2006.01)
(Continued)

(52) U.S. Cl.
CPC ............. *B60N 2/22* (2013.01); *B60N 2/0232* (2013.01); *B60N 2/2222* (2013.01); *B60N 2/643* (2013.01);
(Continued)

(58) Field of Classification Search
CPC ...... B60N 2/22; B60N 2/0232; B60N 2/2222; B60N 2/449; B60N 2/4882; B60N 2/643;
(Continued)

(56) References Cited

U.S. PATENT DOCUMENTS 6,170,786 B1 * 1/2001 Park ..................... B60N 2/0232
248/274.1
6,375,119 B2 * 4/2002 Park ..................... A47C 1/0352
108/44

(Continued)

FOREIGN PATENT DOCUMENTS

| JP | 11-321795 | 11/1999 |
| JP | 2015-20527 | 2/2015 |
| JP | 2015-020564 | 2/2015 |

OTHER PUBLICATIONS

U.S. Appl. No. 15/280,193 to Fumitoshi Akaike et al., filed Sep. 29, 2016.
Office Action issued in Japan Counterpart Patent Appl. No. 2015-196005, dated Apr. 2, 2019, along with English translation thereof.

*Primary Examiner* — Philip F Gabler
(74) *Attorney, Agent, or Firm* — Greenblum & Bernstein, P.L.C.

(57) ABSTRACT

A vehicle seat includes: a seating portion configured to support a seated occupant in a seating posture, the seating portion including a seat cushion portion and a seat back portion; a shell portion configured to cover a circumference of the seating portion from a rear side; and a moving mechanism that is configured to change a reclining angle, which is an angle of the seat back portion of the seating portion relative to the seat cushion portion, together with a position of the shell portion to be in two or more modes including a normal mode and a comfort mode, wherein the moving mechanism moves the shell portion to have a higher height in a seating height direction of the seated occupant with respect to the seat cushion portion in a comfort mode than in a normal mode.

7 Claims, 16 Drawing Sheets

(51) Int. Cl.
  *B60N 2/68* (2006.01)
  *B61D 33/00* (2006.01)
  *B60N 2/64* (2006.01)
  *B60N 2/02* (2006.01)
  *B60N 2/90* (2018.01)
  *B60N 2/885* (2018.01)

(52) U.S. Cl.
  CPC .............. *B60N 2/68* (2013.01); *B60N 2/686* (2013.01); *B60N 2/885* (2018.02); *B60N 2/986* (2018.02); *B61D 33/00* (2013.01); *B64D 11/0639* (2014.12); *B60N 2002/0272* (2013.01)

(58) Field of Classification Search
  CPC .. B60N 2/68; B60N 2/686; B60N 2002/0272; B64D 11/0639; B61D 33/00
  See application file for complete search history.

(56) References Cited

U.S. PATENT DOCUMENTS

| | | | |
|---|---|---|---|
| 6,565,153 B2* | 5/2003 | Hensel | A47C 7/38 297/285 |
| 7,021,706 B2* | 4/2006 | Aufrere | B60N 2/42745 297/216.13 |
| 2004/0004382 A1 | 1/2004 | Dowty | |
| 2011/0121624 A1* | 5/2011 | Brncick | B60N 2/0232 297/284.2 |
| 2015/0028634 A1* | 1/2015 | Scherello | B60N 2/4802 297/163 |
| 2017/0096084 A1* | 4/2017 | Akaike | B64D 11/0639 |
| 2017/0096085 A1* | 4/2017 | Akaike | B64D 11/0639 |
| 2017/0217341 A1* | 8/2017 | Kaneda | B60N 2/4492 |
| 2017/0291511 A1* | 10/2017 | Akaike | B60N 2/427 |
| 2017/0297460 A1* | 10/2017 | Akaike | B60N 2/42745 |

* cited by examiner

VEHICLE SEAT

CROSS-REFERENCE TO RELATED APPLICATION

This application claims priorities from Japanese Patent Application No. 2015-196005 filed on Oct. 1, 2015, the entire subject matters of which is incorporated herein by reference.

TECHNICAL FIELD

The present invention relates to a vehicle seat on which an occupant sits and is mounted on a vehicle such as automobiles, airplanes, vessels and trains.

BACKGROUND

There is a shell-type sheet including a seating portion configured to support an occupant in a seating posture and a shell portion configured to cover the circumference of the seating portion from a rear of the occupant (see JP-A-2015-020527). In such a seat, the shell portion is fixedly disposed to be tilted rearward, and the seating portion is movable in response to the occupant's preference in space in front of the shell portion. In this structure, however, since the shell portion is fixed at the rear even when the seating portion is used in a front position, a wasted space can be formed between the seating portion and the shell portion. For this problem, it is considered that the shell portion is also movable depending on the position of the seating portion.

In this case, however, when the occupant sets a normal mode in order to take a general seating posture in which a reclining angle of the seating portion and the shell portion is relatively small, a height from the installation floor surface of the seat becomes higher, resulting in causing a problem that a gap between an upper end of the shell portion and a ceiling of a vehicle becomes smaller. As a result, all-round visibility of the occupant becomes narrower, and thus an tightness feeling is imparted to the occupant.

SUMMARY

The present disclosure is made in consideration of the above-mentioned circumstances, and one of objects of the present disclosure is to provide a vehicle seat including a seating portion and a shell portion, in which the size of the seat can increase as desired by being reduced in the normal mode and the gap between the upper end of the shell portion and the ceiling of the vehicle is ensured to be relatively large in the normal mode.

According to an illustrative embodiment of the present disclosure, there is provided a vehicle seat including: a seating portion configured to support a seated occupant in a seating posture, the seating portion including a seat cushion portion that serves as a seat portion that supports a bottom of the seated occupant and a seat back portion that serves as a backrest that supports a back of the seated occupant; a shell portion configured to cover a circumference of the seating portion from a rear side; and a moving mechanism that is configured to change a reclining angle, which is an angle of the seat back portion of the seating portion relative to the seat cushion portion, together with a position of the shell portion to be in two or more modes including a normal mode and a comfort mode, wherein the normal mode is a mode in which the reclining angle is set to be relatively small to allow the seated occupant to take a normal seating posture, wherein the comfort mode is a mode in which the relining angle is set to be relatively large to allow the seated occupant to take a comfort posture, and wherein the moving mechanism moves the shell portion to have a higher height in a seating height direction of the seated occupant with respect to the seat cushion portion in the comfort mode than in the normal mode.

DETAILED DESCRIPTION

Figure 1:
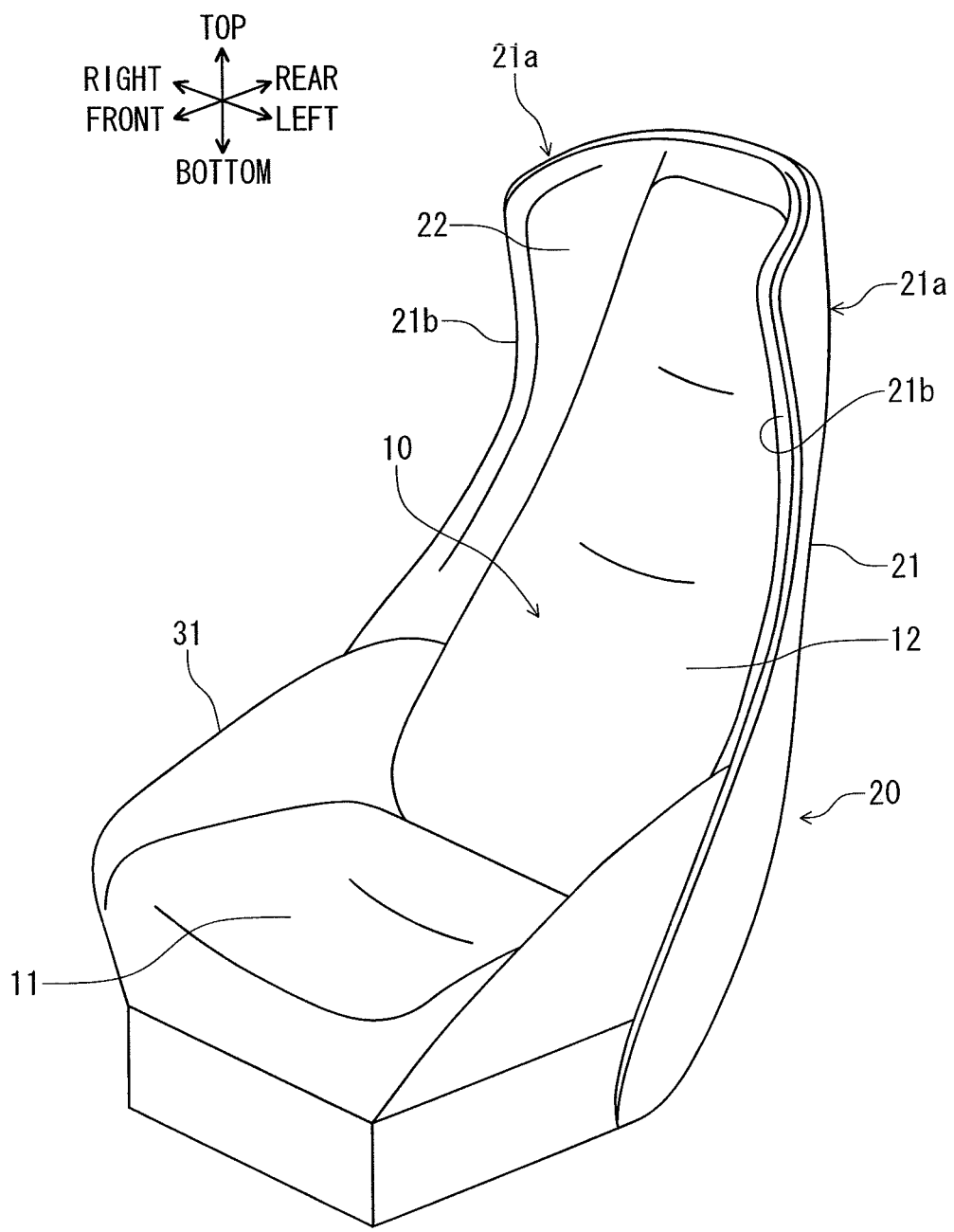
FIG. 1 is a perspective view of an embodiment according to the present disclosure, illustrating a state in which a shell portion is integrated with a seating portion without separating.
Figure 2:
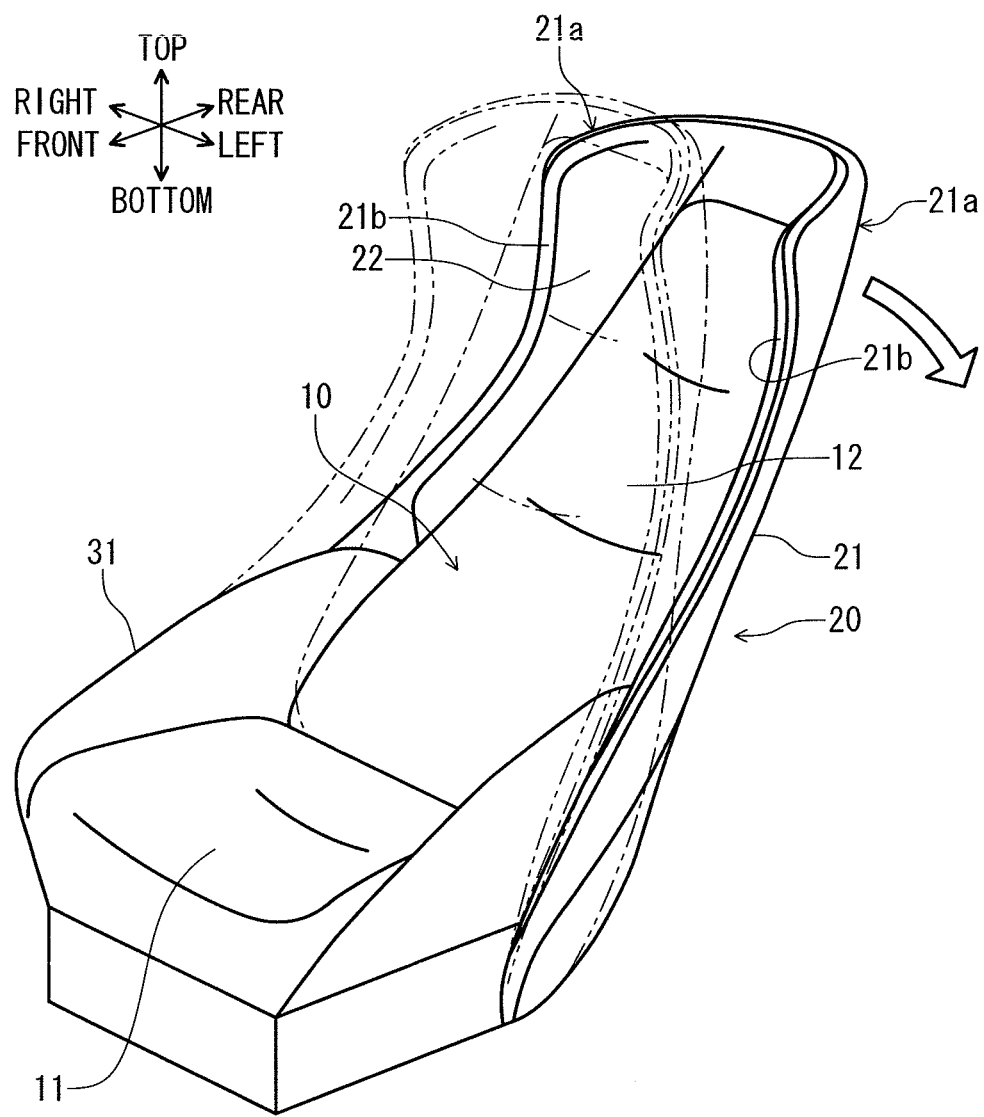
FIG. 2 is a perspective view similar to FIG. 1, illustrating a state in which a seat back portion of the seating portion is tilted rearward, while integrating the shell portion to the seating portion without separating.
Figure 3:
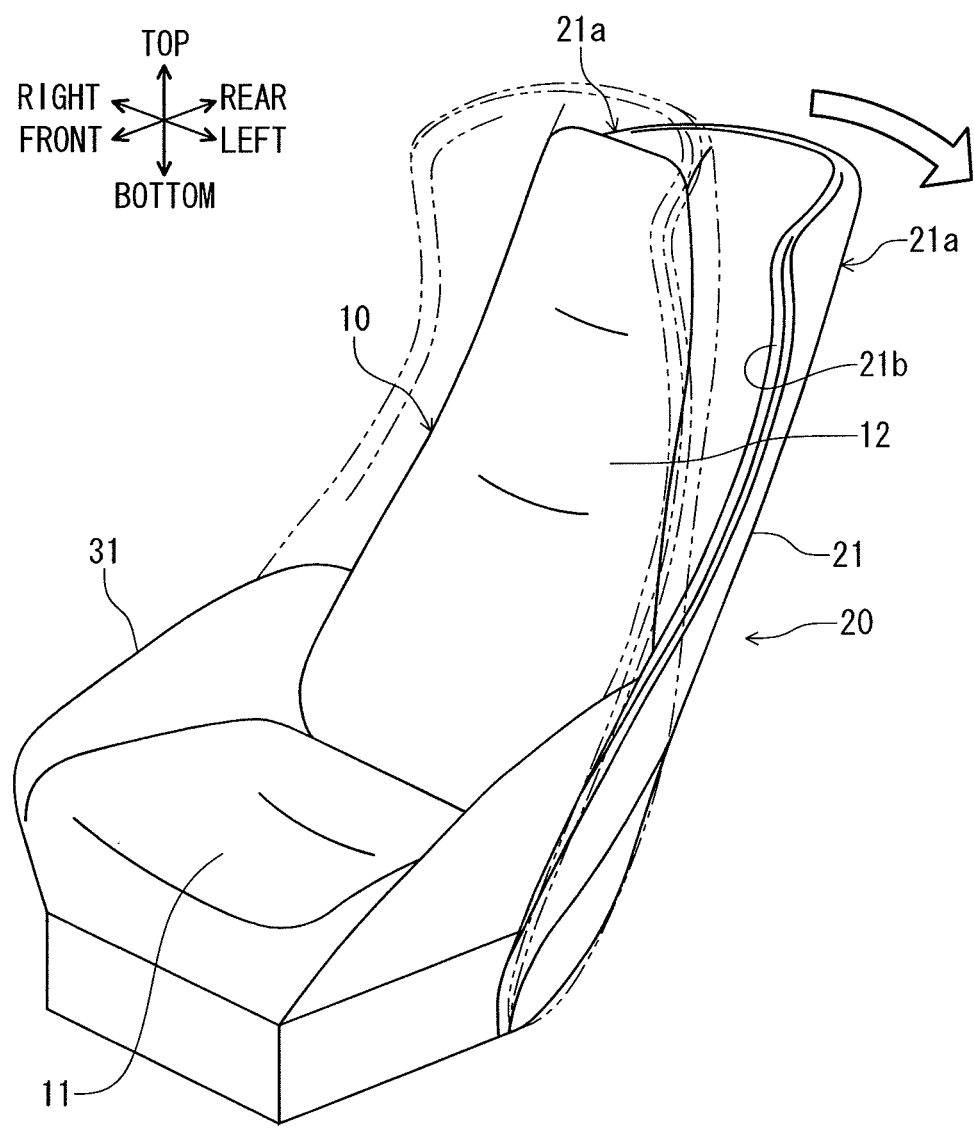
FIG. 3 is a perspective view similar to FIG. 1, illustrating a state in which the shell portion is spaced apart from the seating portion.

FIGS. 1 to 3 illustrate an exterior of a vehicle seat according to an embodiment of the present disclosure. This seat is a shell type seat which provides a personal aesthesis to a seated occupant, and both side portions of a seating portion 10 are covered with a shell portion 20. Here, the seat includes the seating portion 10 and the shell portion 20 configured as separate members. In the following description, the respective directions will be described based on a direction viewed from the occupant seated on the seat.

The seating portion 10 which supports the occupant in a seating posture includes a seat cushion portion 11 and a seat back portion 12. The seat cushion portion 11 forms a seat portion at the bottom of the occupant, and the seat back portion 12 serves as a backrest in the occupant's back. As it will be described below, the seat back portion 12 is able to adjust a rear tilt angle relative to the seat cushion portion 11 by a first reclining mechanism behind the seat cushion portion 11. The seat cushion portion 11 and the seat back portion 12 are configured by laminating a urethane pad as an elastic material on a frame as a frame member and by covering a seat cover thereon as a skin material. The seat cushion portion 11 may be configured to freely move on a floor for installing the seat in the longitudinal and the lateral directions, by a longitudinal slide rail and a lateral slide rail.

The regions around the side portions from the rear of the seating portion 10 are covered with the shell portion 20. Specifically, the shell portion 20 includes an upper shell 21 and an under shell 31. The upper shell 21 is disposed behind the seating portion 10 including the seat cushion portion 11 and the seat back section 12, and the under shell 31 is disposed on both side portions of the seating portion 10. The under shell 31 is fixed to the seat cushion portion 11. As described below, the upper shell 21 is attached to the seat cushion portion 11 via a second reclining mechanism, and is capable of adjusting the rear tilt angle relative to the seat cushion portion 11.

Each of the upper shell 21 and the under shell 31 is configured by integral molding of resin, and a frame as a frame member is incorporated in the interior of the resin molded product, as an insert material of insert molding. On the side facing the seated occupant of the resin molded product constituting the upper shell 21 and the under shell 31, an elastic body 22 is provided, and the elastic body 22 includes a urethane pad as an elastic material, and a skin material covering the surface thereof.

The shape and structure of the shell portion 20 including the upper shell 21 and the under shell 31 may be adopted as various types depending on the design concept of the seat. The seat of this embodiment is a shell type seat which provides a personal aesthesis, and sets the shell portion 20 as a shape and a structure that can provide the personal aesthesis to the seated occupant. When it is desired to provide the seat as a sport seat, the shell portion 20 can be set to a shape and a structure like a bucket seat.

As described above, the seat back portion 12 and the upper shell 21 are able to individually adjust the rear tilt angle with respect to the seat cushion portion 11. Therefore, as illustrated in FIGS. 1 and 2, in a state in which the seat back portion 12 and the upper shell 21 integrally overlap in the longitudinal direction, it is possible to adjust the rear tilt angle of the seat back portion 12 and the upper shell 21 relative to the seat cushion portion 11 (see FIGS. 5 and 6). In this state, as illustrated in FIG. 7, because both side portions of the seated occupant P are covered with both the side portions 21a of the upper shell 21, the personal aesthesis is imparted to the occupant P.

Figure 8:
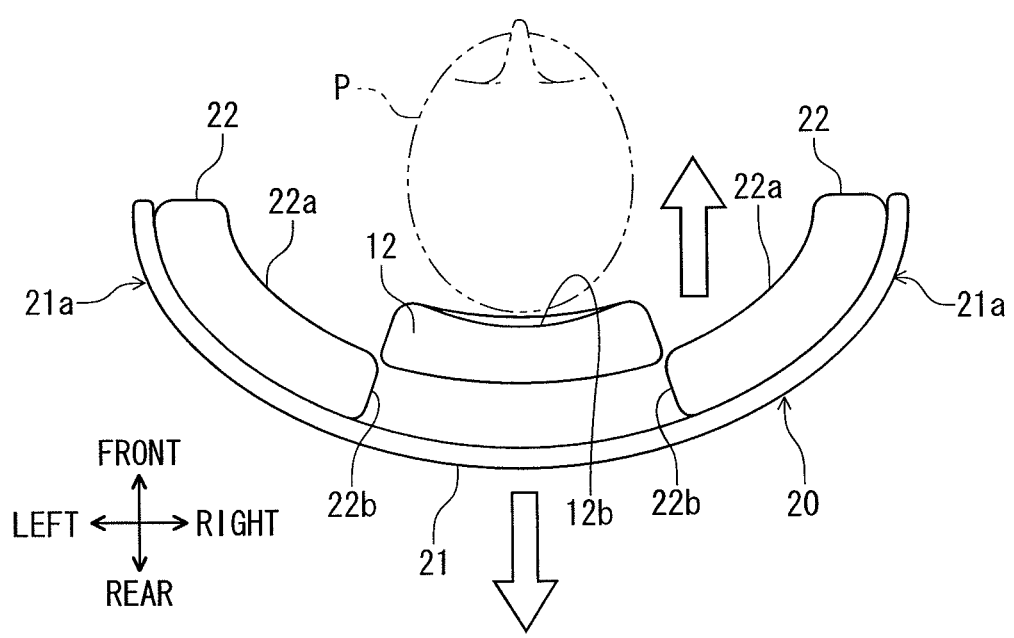
FIG. 8 is a plan view similar to FIG. 7, illustrating a state in which the shell portion is spaced apart from the seating portion.

As illustrated in FIGS. 3 and 8, it is possible to space the upper shell 21 apart from the seat back portion 12. In this state, because both side portions of the upper half body of the seated occupant P are not covered with both side portions 21a of the upper shell 21, or because the amount of covered portions is small, the occupant P may feel sense of openness with no senses of surrounding and tightness.

Figure 7:
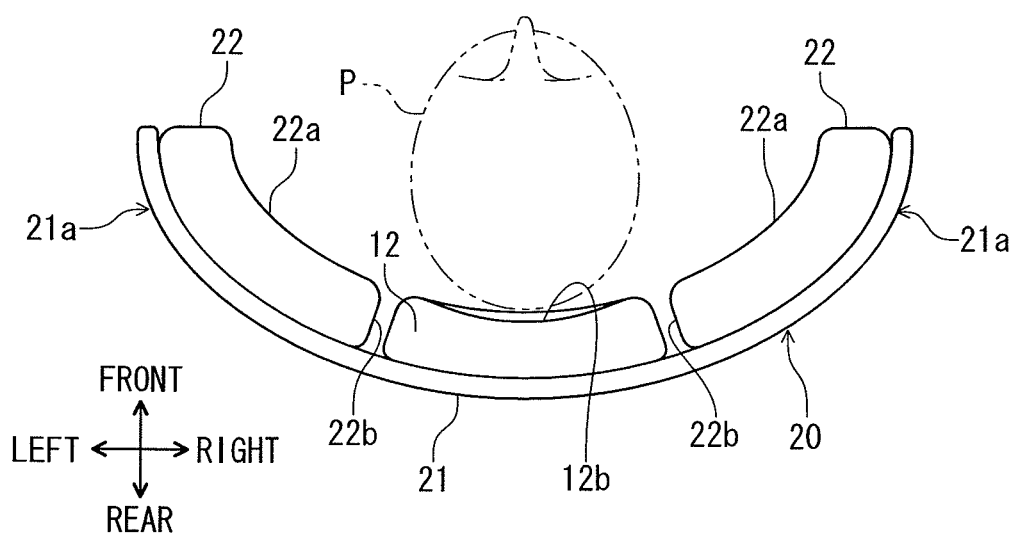
FIG. 7 is a plan view of the embodiment, illustrating a state in which the shell portion is integrated with the seating portion without separating.

As illustrated in FIG. 7, the seating surface of the occupant P of the seat back portion 12 has a shape that wraps around the back of the seated occupant P from the back and side, and the seating side of the occupant P is configured by a recessed curved surface 12b. In a state in which the shell portion 20 integrally overlaps the seating portion 10 in the longitudinal direction, the occupant P side of the elastic body 22 of the upper shell 21 is continued to the curved surface 12b of the seat back portion 12, and is configured by a curved surface 22a that laterally extends from the curved surface 12b.

Therefore, as illustrated in FIG. 8, in a state in which the shell portion 20 is spaced apart from the seating portion 10, the back of the occupant P is stably supported by the curved surface 12b of the seat back portion 12. As illustrated in FIG. 7, in a state in which the shell portion 20 integrally overlaps the seating portion 10 in the longitudinal direction, on the curved surface 12b of the seat back portion 12, a surface for receiving the back of the occupant P extends to be connected to the curved surface 22a of the elastic body 22 of the upper shell 21 (see FIG. 4). Thus, the occupant P can secure a wide space therearound and take a relaxed posture.

Figure 9:
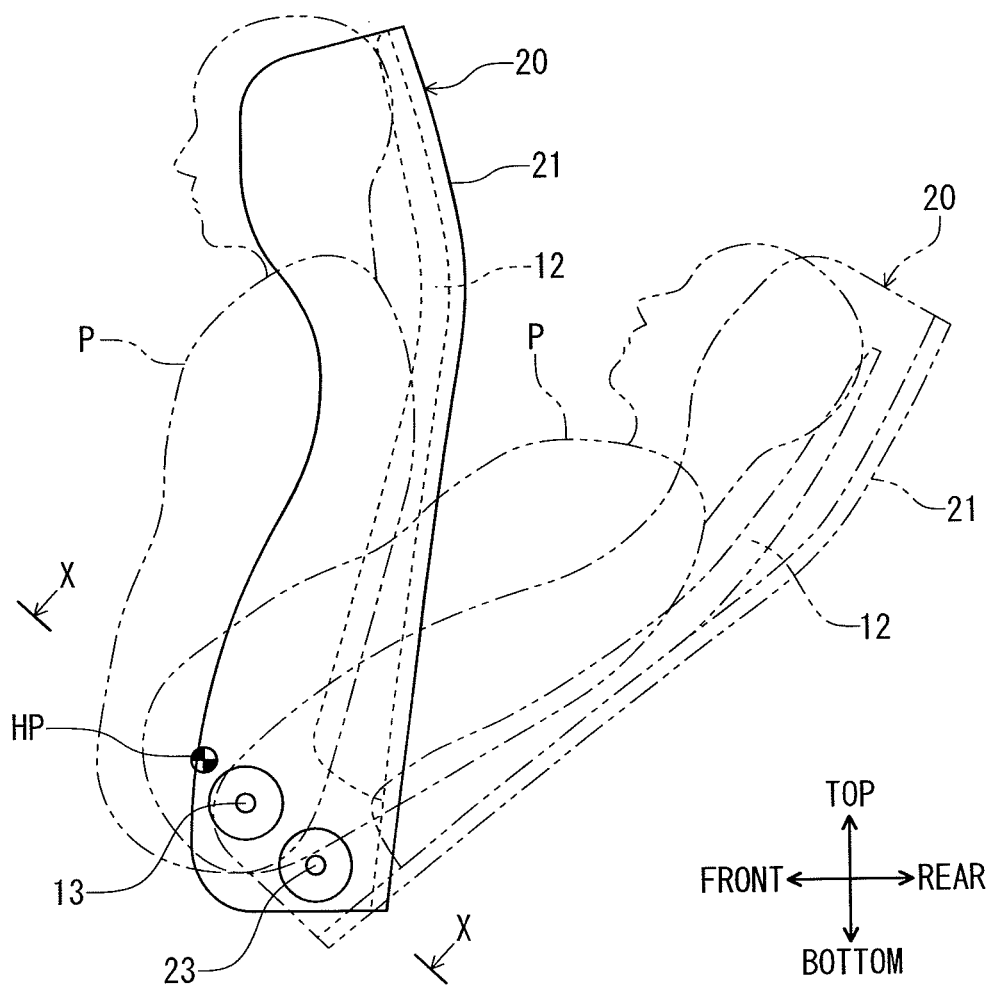
FIG. 9 is an explanatory diagram of an operation of the embodiment, illustrating a tilt angle adjustment operation of the seat back portion of the seating portion.

As illustrated in FIG. 9, the seat back portion 12 is able to adjust the rear tilt angle relative to the seat cushion portion 11 by the first reclining mechanism 13. The upper shell 21 is able to adjust the rear tilt angle relative to the seat cushion portion 11 by the second reclining mechanism 23. A rotational center of the second reclining mechanism 23 is disposed to be spaced apart rearward and downward from a hip point HP of the seated occupant P. In other words, the rotational center of the second reclining mechanism 23 is located in the fourth quadrant in the plane coordinate by the horizontal axis and vertical axis intersecting with each other at the hip point HP. Further, the rotational center of the first reclining mechanism 13 is located at a position closer to the hip point HP of the seated occupant P than the rotational center of the second reclining mechanism 23. The second reclining mechanism 23 corresponds to the moving mechanism of the present disclosure.

As a result, when adjusting the rear tilt angle of the seat back portion 12 of the seating portion 10, since the rotational centers of the hip point HP and the seat back portion 12 as the rotational center of the upper half body of the occupant P are close to each other, the relative displacement between the change in the position of the back of the occupant P and the change in the position of the seating surface of the seat back portion 12 is reduced. Therefore, when increasing the rear tilt angle of the seat back portion 12, it is possible to suppress the discomfort in which cloth is displaced and rises at the back of the occupant P due to the relative displacement.

Meanwhile, when adjusting the rear tilt angle of the upper shell 21 at the same time as the seat back portion 12, since the rotational centers of the hip point HP and the upper shell 21 as the rotational center of the upper half body of the occupant P are spaced apart from each other, the relative displacement between the change in position of the upper half body of the occupant P and the change in the position of the upper shell 21 increases. That is, it is possible to increase the height in the seating height direction of the occupant P in the upper shell 21 relative to the seat cushion portion 11. Therefore, when increasing the rear tilt angle of the upper shell 21, by the relative displacement, in the normal mode indicated by a solid line in FIG. 9, the upper shell 21 located at a position lower than the seating height of the occupant P rises relative to the position equal to the seating height of the occupant P in the comfort mode illustrated by a virtual line in FIG. 9. Therefore, while imparting the personal aesthesis to the occupant P in the comfort mode, as illustrated in FIG. 5, it is possible to ensure a predetermined distance 1 between the upper end of the upper shell 21 and a ceiling L of the vehicle in the normal mode.

In the present disclosure, the seating height direction is used to refer to a direction in which a spine of the seated occupant P extends in a state where the seated occupant P is leaned back on the seat back portion 12, which substantially matches a direction toward which the seat back portion 12 extends from the seat cushion portion 11. The seating height direction is angled from a vertical direction as the seat back portion 12 is tilted.

Because the rotational centers of both of the seat back portion 12 and the occupant P are close to each other, the position of the seat back portion 12 relative to the occupant P is maintained substantially constant, regardless of the change in the rear tilt angle of the seat back portion 12. As a result, in the normal mode illustrated by the solid line in FIG. 9, the upper end position of the upper shell 21 and the upper end position of the seat back portion 12 are substantially the same at the height in the seating height direction of the occupant P, and meanwhile, in the comfort mode illustrated by the virtual line in FIG. 9, the upper end position of the upper shell 21 becomes higher at the height in the seating height direction of the occupant P than the upper end position of the seat back portion 12.

Figure 4:
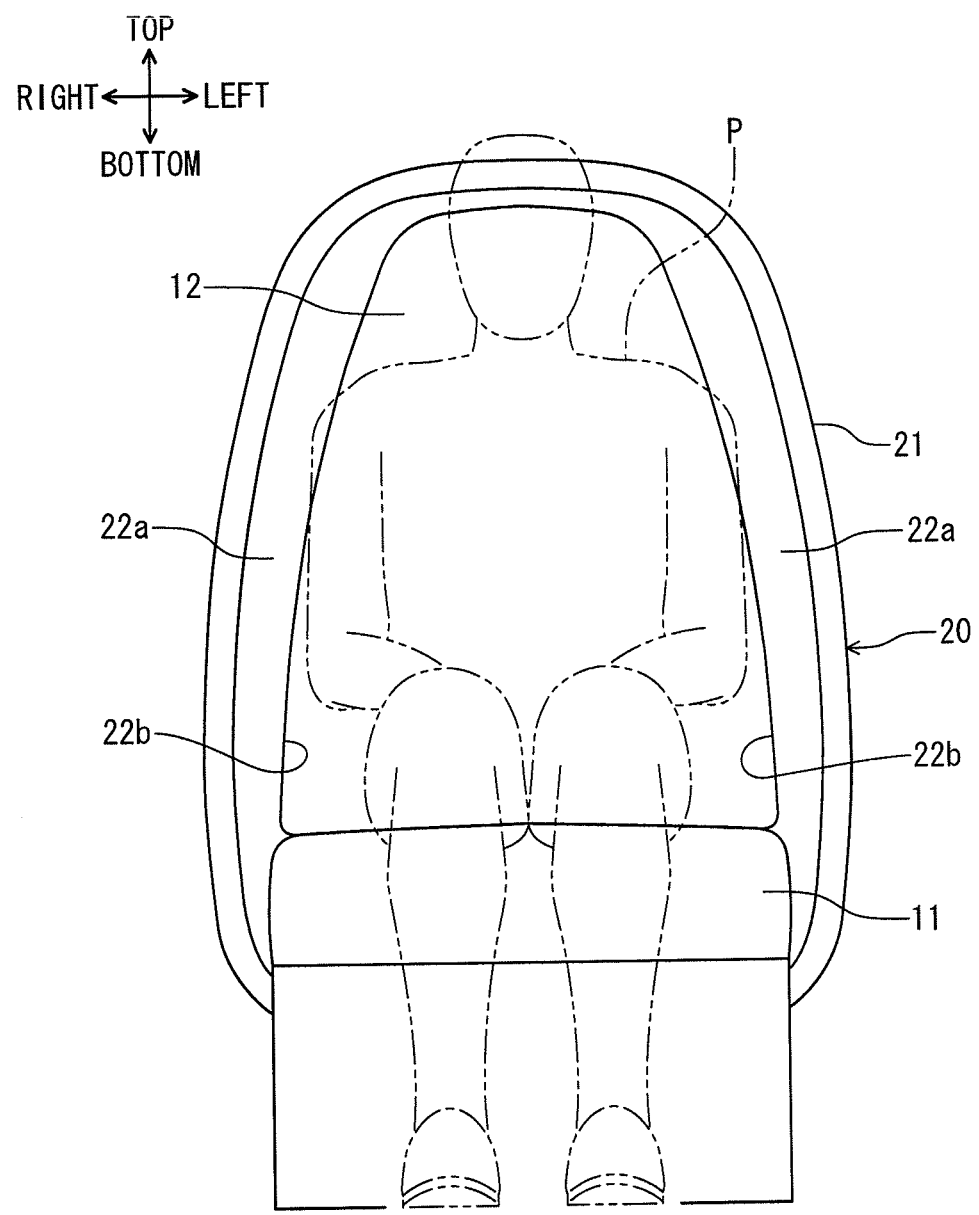
FIG. 4 is a front view of the embodiment.
Figure 5:
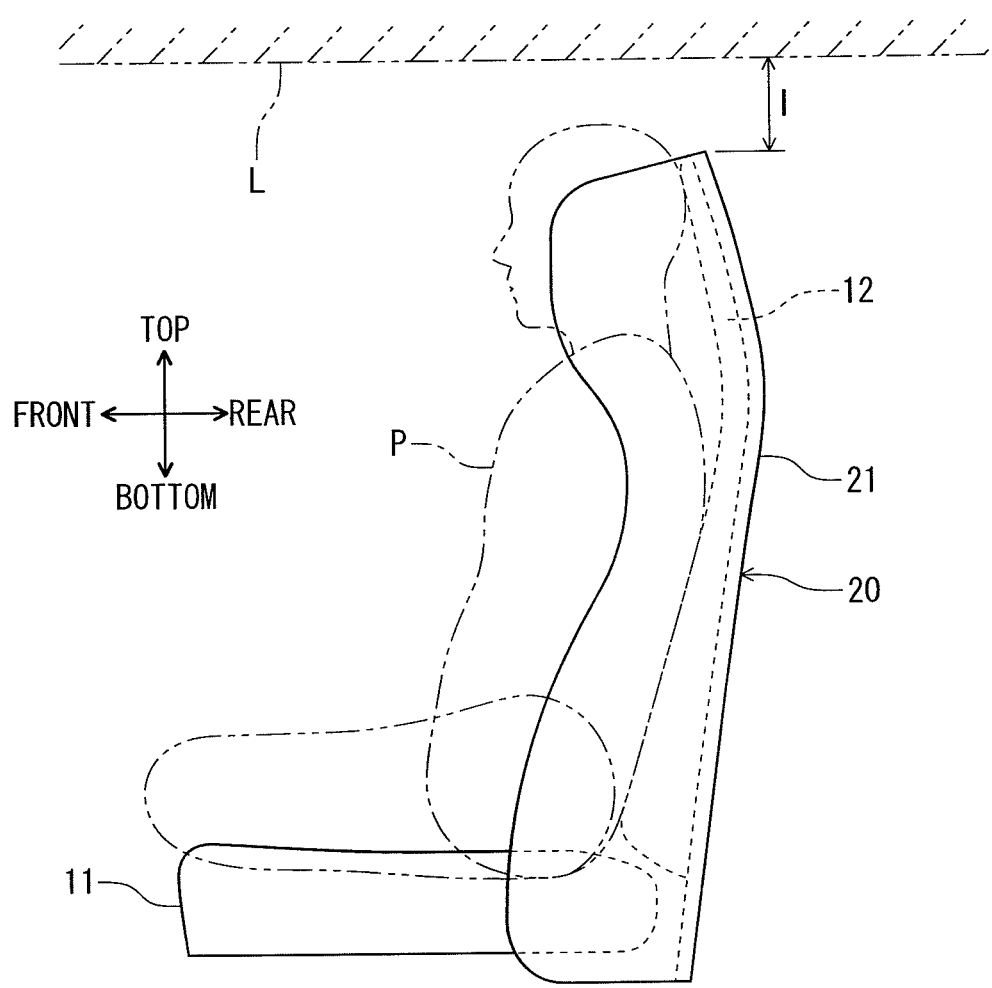
FIG. 5 is a side view of the embodiment, illustrating a state in which a seating posture is in a normal mode.

As illustrated in FIGS. 4 and 5, when the seat back portion 12 and the upper shell 21 are located at the positions of the normal mode, the seat back portion 12 is fitted to a notch portion 22b formed in the elastic body 22 of the upper shell 21. That is, the elastic body 22 of the upper shell 21 is formed with the notch portion 22b to correspond to the outer shape of the seat back portion 12.

Figure 6:
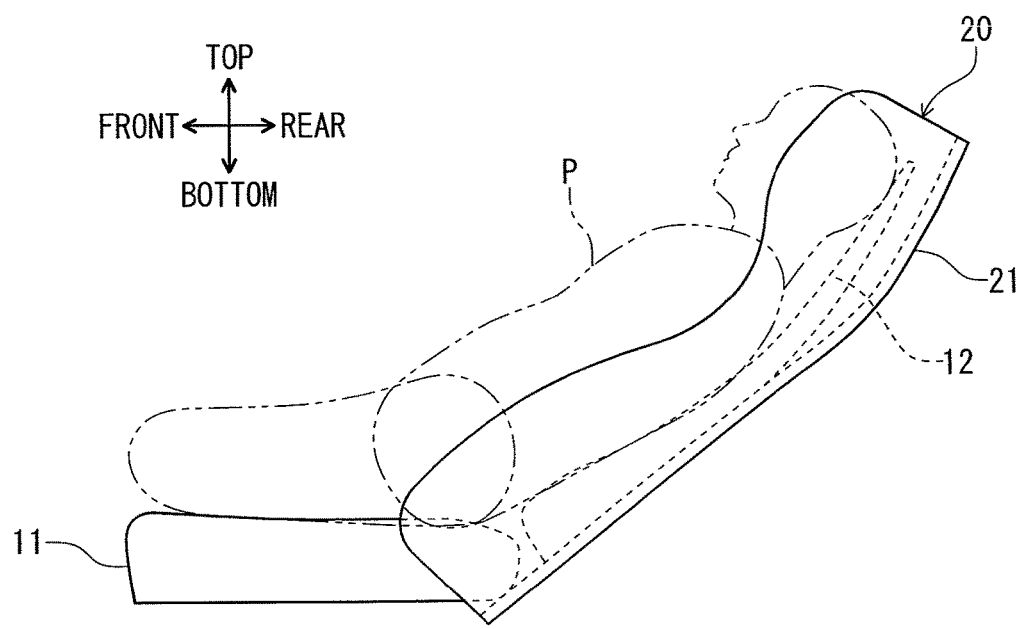
FIG. 6 is a side view of the embodiment, illustrating a state in which the seating posture is in a comfort mode.

As illustrated in FIG. 6, when the seat back portion 12 and the upper shell 21 enter the comfort mode, the upper shell 21 moves relatively upward with respect to the seat back portion 12. Therefore, as illustrated in FIG. 4, a lower part of a boundary portion between the seat back portion 12 and the upper shell 21 is formed to be gradually wider than an upper part thereof. In the comfort mode, along with the relative movement of the seat back portion 12 and the upper shell 21, a gap is formed at the boundary portion.

As illustrated in FIG. 4, the lower part of the upper shell 21 is greater in a lateral width than the upper part thereof. Therefore, in the comfort mode, when the upper shell 21 moves relatively upward with respect to the seat back portion 12, the occupant P is located in the wide region of the upper shell 21. Therefore, the occupant P can take a comfortably relaxed posture.

Figure 10:
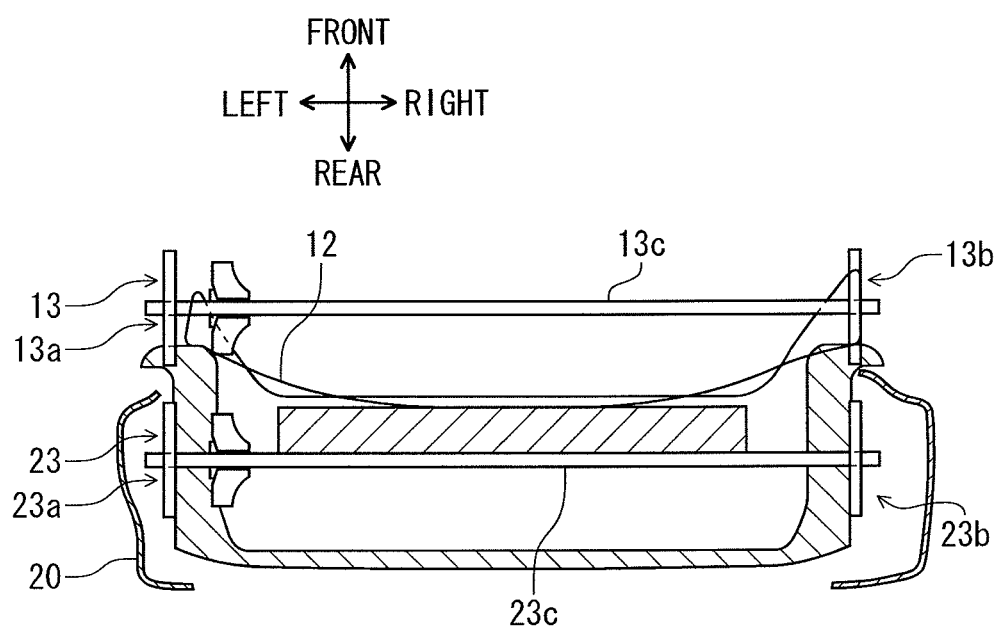
FIG. 10 is a cross-sectional view taken along the line X-X of FIG. 9 as viewed from the arrow direction.

As illustrated in FIG. 10, the first reclining mechanism 13 is configured so that a driving-side recliner 13a and a driven-side recliner 13b are connected by a connecting rod 13c. Therefore, when the driving-side recliner 13a is driven by a first motor, the driven-side recliner 13b is also driven via the connecting rod 13c in conjunction with each other. The driving-side recliner 13a and the driven-side recliner 13b are rotatably coupled between the rear both side portions of the seat cushion portion 11 and the lower both side portions of the seat back portion 12.

The second reclining mechanism 23 has the same configuration as the first reclining mechanism 13. That is, the second reclining mechanism 23 is configured so that a driving-side recliner 23a and a driven-side recliner 23b are connected to each other by a connecting rod 23c. The driving-side recliner 23a and the driven-side recliner 23b are rotatably coupled between the rear both side portions of the seat cushion portion 11 and the lower both side portions of the upper shell 21.

Figure 12:
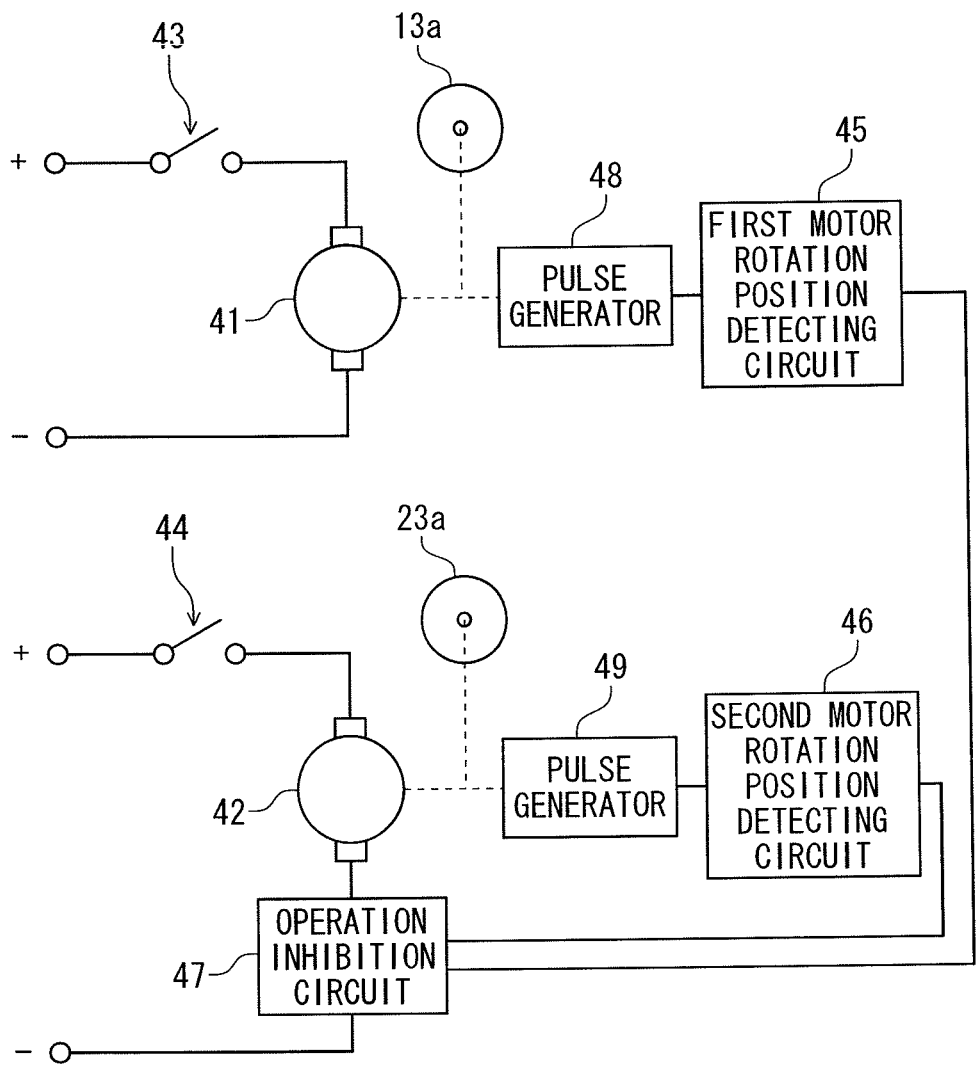
FIG. 12 is an electric circuit diagram of the above-mentioned embodiment.

As illustrated in FIG. 12, a first motor 41 is configured to rotationally drive the driving-side recliner 13a of the first reclining mechanism 13, and is connected to a power supply via a switch 43 that is optionally on/off operated. The first motor 41 is configured to generate a pulse signal at every predetermined angular rotation by a pulse generator 48, and a first motor rotation position detecting circuit 45 is configured to detect the rotational position of the first motor 41 based on the pulse signal count by receiving the pulse signal.

Meanwhile, a second motor 42 is configured to rotationally drive the driving-side recliner 23a of the second reclining mechanism 23, and is connected to a power supply via a switch 44 which is optionally on/off operated. The second motor 42 is configured similarly to the first motor 41, and the second motor rotation position detecting circuit 46 is also configured similarly to the first motor rotation position detecting circuit 45, and is configured to detect the rotational position of the second motor 42 based on the pulse signal count from a pulse generator 49.

The detection outputs of the first motor rotation position detecting circuit 45 and the second motor rotation position detecting circuit 46 are supplied to an operation inhibition circuit 47. When the rotational position of the second motor 42 detected by the second motor rotation position detecting circuit 46 is spaced apart from the rotational position of the first motor 41 detected by the first motor rotation position detecting circuit 45 by a predetermined amount or more, the operation inhibition circuit 47 cuts off the power supply circuit of the second motor 42 to stop the operation of the second motor 42. The rotational position of the first motor 41 corresponds to the rear tilt angle of the seat back portion 12, and the rotational position of the second motor 42 corresponds to the rear tilt angle of the upper shell 21. Therefore, the operation inhibition circuit 47 regulates the relative spaced distance of the upper shell 21 with respect to the seat back portion 12 by a predetermined amount to prevent the upper shell 21 from being spaced apart from the seat back portion 12 by a predetermined amount or more.

In this way, because the upper shell 21 is configured not to be spaced apart from the seat back portion 12 by a predetermined amount or more, strength required as a seat for collision safety and the like can be secured by the combined strength of the seat back portion 12 and the upper shell 21.

Figure 13:
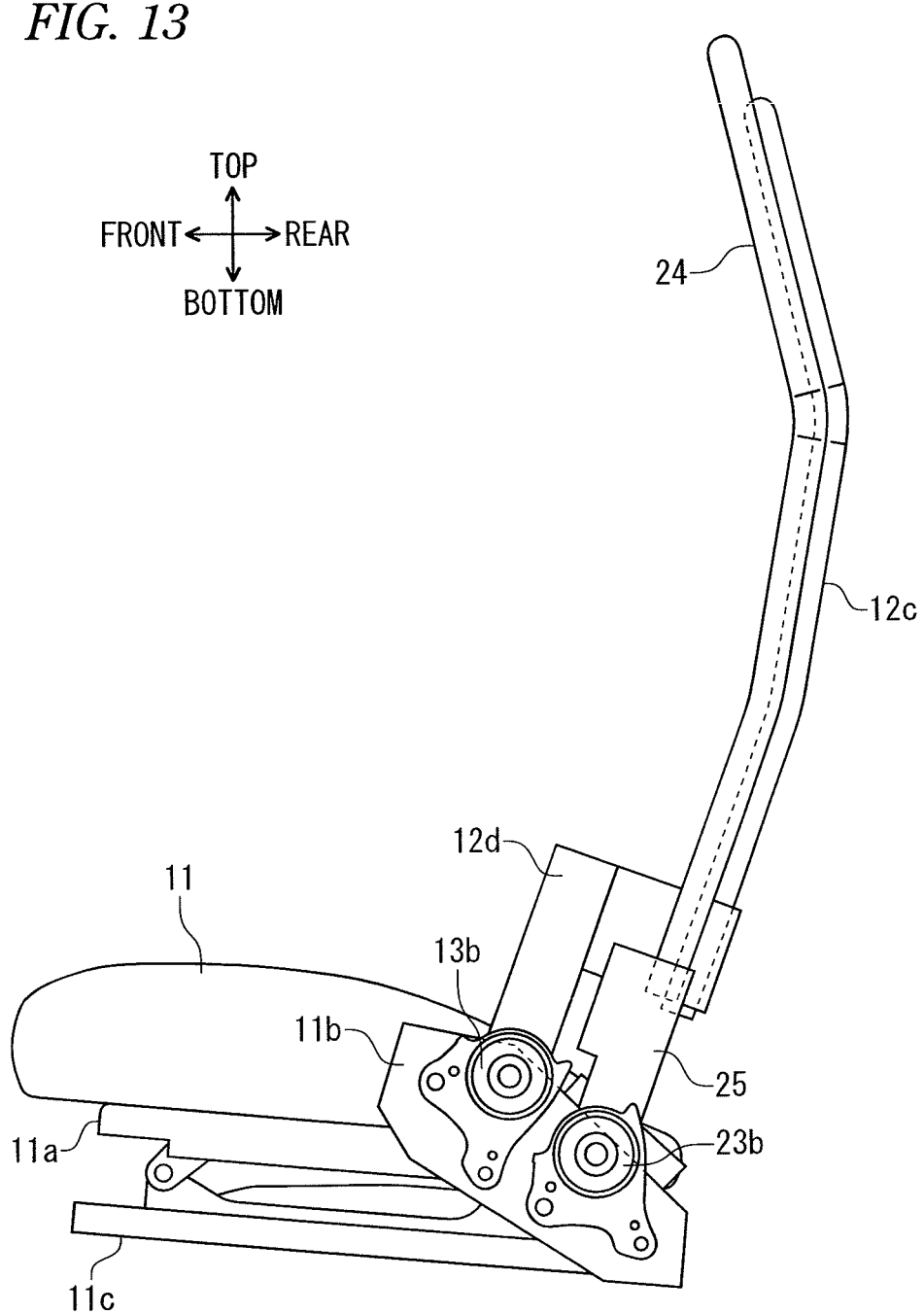
FIG. 13 is a side view illustrating a frame structure of the seating portion and the shell portion of the embodiment.
Figure 14:
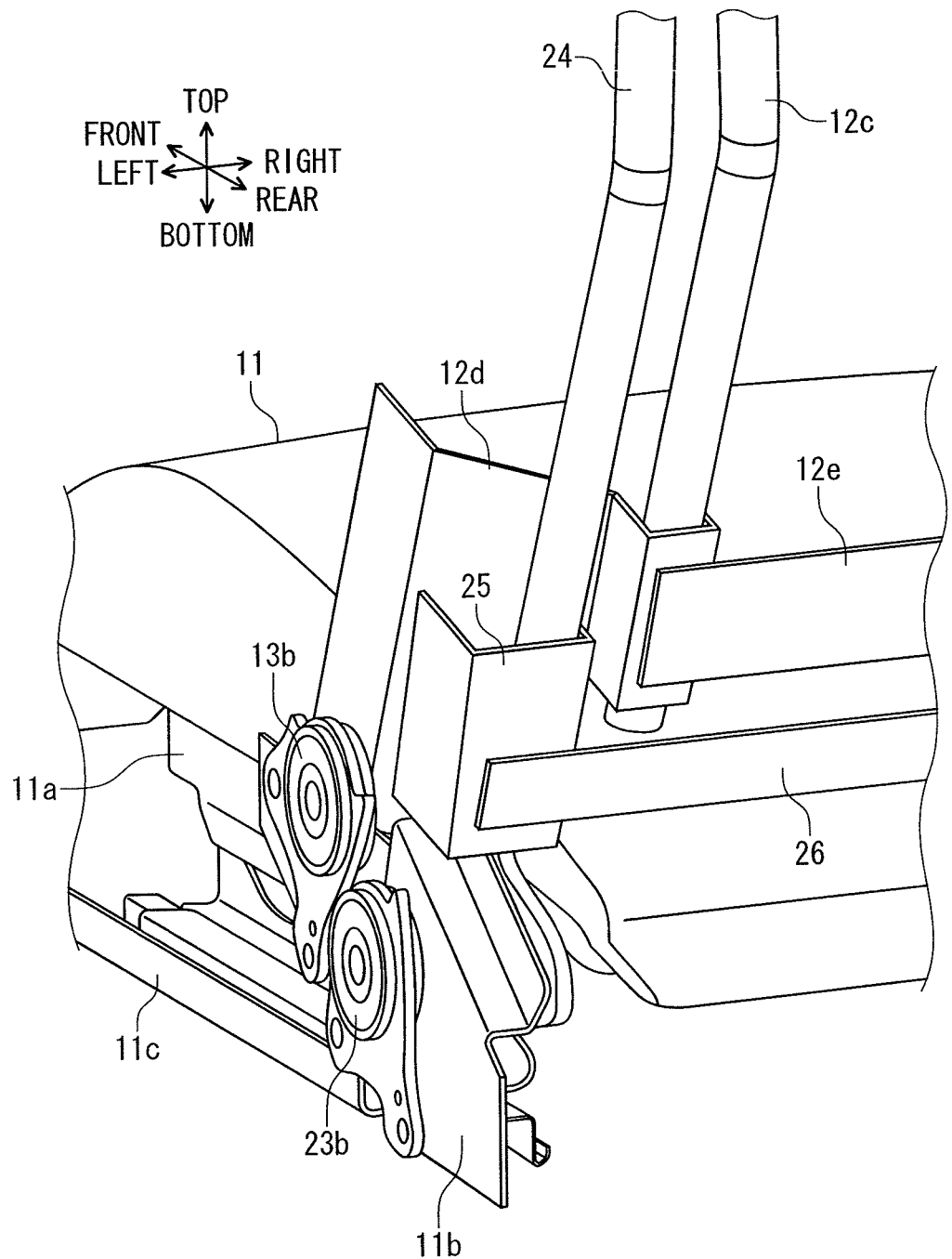
FIG. 14 is a perspective view illustrating the same frame structure as in FIG. 13.

FIGS. 13 and 14 illustrate the frame structure of the seating portion 10 and the upper shell 21. A cushion frame 11a of the seat cushion portion 11 is configured to be supported on a slide rail 11c. A bracket 11b with a front upward inclination is fixed to both of the left and right outer sides of the cushion frame 11a (only the left side is illustrated in FIGS. 13 and 14). The recliner of the first reclining mechanism 13 (the driven-side recliner 13b is illustrated in FIGS. 13 and 14) is fixed to the bracket 11b on the front upper side along the inclination, and the recliner of the second reclining mechanism 23 (the driven-side recliner 23b is illustrated in FIGS. 13 and 14) is fixed to the bracket 11b on the rear lower side thereof.

The back frames 12c and 24 serving as frame members of the seat back portion 12 and the upper shell 21 of the seating portion 10 are configured by mutually similar shaped and approximately inverted U-shaped pipe. The back frames 12c and 24 are disposed such that the back frame 12c is fitted to the back frame 24 in a positional relation that the back frame 12c is located inward and slightly rearward with respect to the back frame 24. Each of the back frames 12c and 24 is fixed to the bracket 11b via each recliner (the driving-side recliners 13a and 23a and the driven-side recliners 13b and 23b) and the brackets 12d and 25 to be adjustable the rear tilt angle. Further, the lower panels 12e and 26 are fixed to the rear portions of the brackets 12d and 25 to couple each of the brackets 12d and 25 disposed on both of the left and right sides.

The states of FIGS. 13 and 14 illustrate a state in which the seating portion 10 and the upper shell 21 integrally overlap in the longitudinal direction, that is, a state of being in the normal mode. In this state, the back frame 12c and the bracket 12d serving as frame members of the seat back portion 12 side, and the back frame 24 and the bracket 25 serving as frame members of the upper shell 21 side are disposed so as not to interfere with each other. Further, it is possible to tilt rearward both of the back frame 12c and the back frame 24 by the operation of the each recliner (driving-side recliners 13a and 23a and the driven-side recliners 13b and 23b) from this state. In addition, it is possible to perform the operation so that the rear tilt angle of the back frame 24 becomes greater than that of the back frame 12c.

Figure 11:
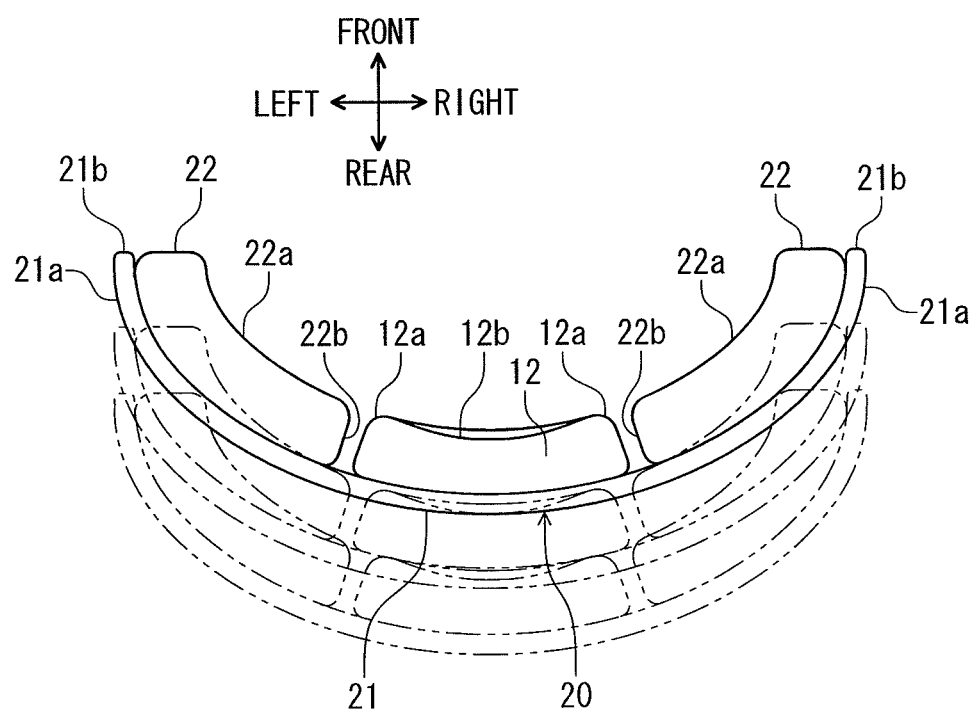
FIG. 11 is an explanatory view of the operation the embodiment, illustrating the position change of the shell portion between a state of integrating the shell portion with the seating portion without separating and a state of separating the shell portion from the seating portion in a plan view.

FIG. 11 illustrates a change in position of the seat back portion 12 and the upper shell 21 between the state of spacing the upper shell 21 apart from the seat back portion 12 and the integrated state without being separated in a plan view. The solid line in FIG. 11 indicates a state in which the upper shell 21 is integrated with the seat back portion 12 without separating, the seating surface of the seat back portion 12 is formed along a single curved surface with the front side surface of the elastic body 22 of the upper shell 21, and the occupant P is supported on the spread seating surface along the single curved surface with ample space. In addition, since both side portions of the occupant P are covered with the both side portions 21a of the upper shell 21, the personal aesthesis is imparted.

Meanwhile, the virtual line in FIG. 11 indicates a state of spacing the upper shell 21 apart from the seat back portion 12, and at the position of the virtual line shown by the thick line, both side ends 21b of both side portions 21a of the upper shell 21 are equivalent to the both side ends 12a of the seat back portion 12 or are located behind the both side ends 12a. This position is a position at which the operation of the second motor 42 is stopped by the operation inhibition circuit 47, and the upper shell 21 is not further spaced apart from the seat back portion 12. In this state, because both side portions of the upper half body of the seated occupant P are not covered with the both side portions 21a of the upper shell 21, the occupant P can feel a sense of openness with no senses of surrounding and tightness. Further, it is possible to secure the seat strength by maintaining the linkage relation between the seat back portion 12 and the upper shell 21.

The position of the virtual line shown by the thin line illustrates a case where the spaced distance of the upper shell 21 with respect to the seat back portion 12 is in an intermediate level. At this position, the occupant P is not supported by the spread seating surface along a single curved surface as in the case of the position indicated by the solid line. However, although the curved surface 22a of the elastic body 22 of the upper shell 21 and the curved surface 12b of the seat back portion 12 are spaced apart from each other in the longitudinal direction, a body of the occupant P is supported between the seat back portion 12 and the curved surface 22a of the elastic body 22 of the upper shell 21. As a result, it is possible to perform the adjustment according to preference, such as being able to feel the sense of openness to some degree, while appropriately ensuring the width of the region in which the body of the occupant P is supported, by the adjustment of the spaced distance.

Figure 15:
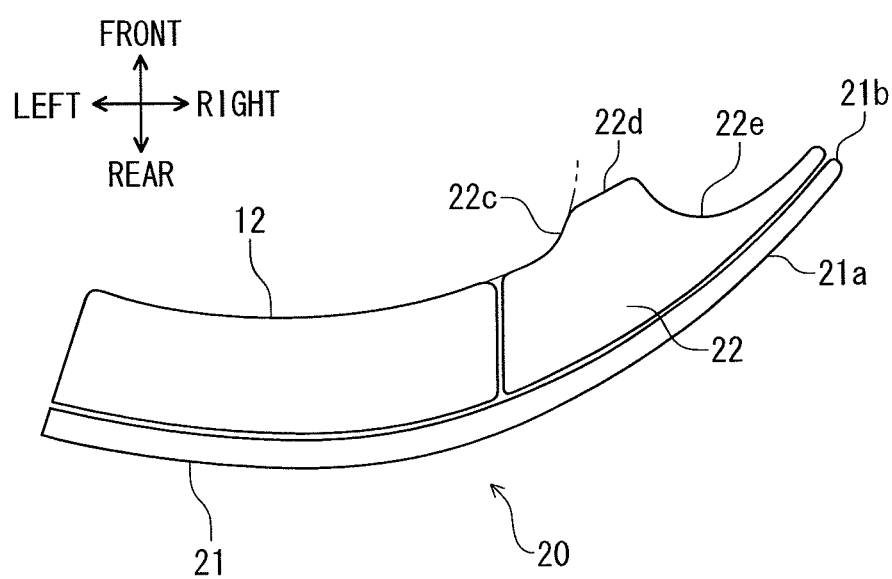
FIG. 15 is a diagram corresponding to FIG. 7 illustrating a modified example of the elastic body in the upper shell.
Figure 16:
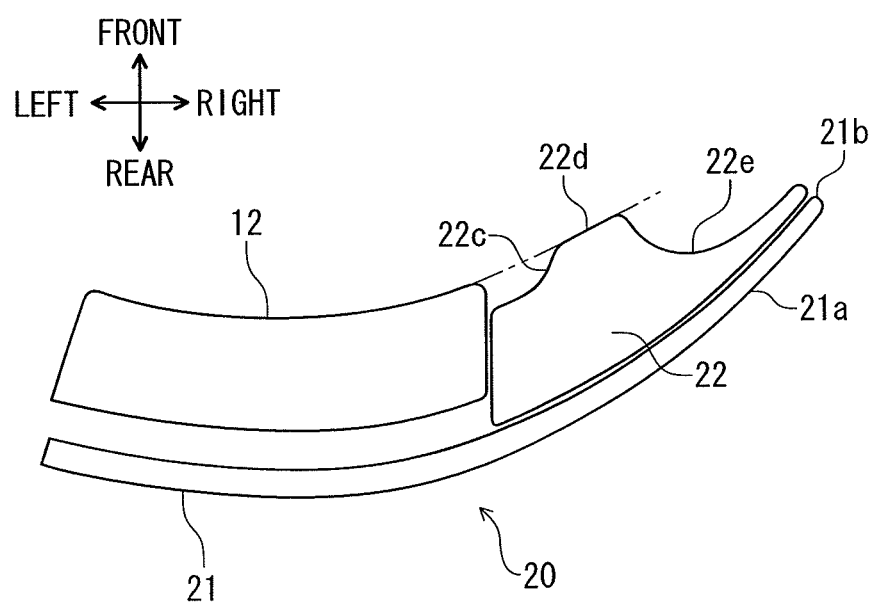
FIG. 16 is a diagram similar to FIG. 15, illustrating the state of spacing the shell portion from the seating portion.

FIGS. 15 and 16 illustrate a modified example of the elastic body 22 of the upper shell 21. In this modified example, as compared to the embodiment, the shape of the elastic body 22 on the seating surface side is modified. Specifically, a protruding portion 22d protruding to the seating surface side is formed at the center portion in the lateral direction of the elastic body 22, and a recess is formed on the outside (right side in FIG. 15) of the protruding portion 22d in the lateral direction. A recessed outer curved portion 22e is formed on the seating surface side by the recess. Further, a recessed inner curved portion 22c is formed on the inside of the protruding portion 22d in the lateral direction on the seating surface side.

According to this modified example, as illustrated in FIG. 15, in the state in which the upper shell 21 is integrated with the seat back portion 12 without separating, the seating surface of the seat back portion 12 is formed along a single curved surface with the inner curved portion 22c of the elastic body 22 of the upper shell 21 as illustrated by the virtual line, and the occupant P is supported on the spread seating surface along the single curved surface with ample space.

Meanwhile, as illustrated in FIG. 16, in a state in which the upper shell 21 is slightly spaced apart from the seat back portion 12 (illustrated in a virtual line) to make the seating surface side of the protruding portion 22d follow a single curved surface with the seating surface of the seat back portion 12, the body of the occupant P is supported by the seating surface side of the protruding portion 22d and the seating surface of the seat back portion 12 along the single curved surface. Accordingly, it is possible to support a large occupant P on the spread seating surface with ample space as compared to the case of FIG. 15.

As disclosed with reference to the embodiment, a first aspect of the present disclosure is to provide a vehicle seat including: a seating portion that supports an occupant in a seating posture; a shell portion that covers a circumference of the seating portion from a rear, the seating portion including a seat back portion that forms a seat portion at the bottom of the occupant, and a seat back portion that serves as a backrest at the back of the occupant; and a moving mechanism that is capable of changing a reclining angle, which is an angle of the seat back portion of the seating portion relative to the seat cushion portion, together with a position of the shell portion, and moving the shell portion such that a height in a seating height direction of a seated occupant relative to the seat cushion portion is increased relative to the seating portion in a comfort mode in which the reclining angle is relatively large and the occupant takes a comfort posture, compared to a normal mode in which the reclining angle is relatively small and the occupant takes a normal seating posture.

In the first aspect of the present disclosure, the moving mechanism can realize the movement of the shell portion relative to the seating portion by shifting rotational centers to each other during adjustment of the reclining angle of the seating portion and the shell portion. Further, the movement can also be realized by a link mechanism. The shell portion may have a structure that covers both of the seat cushion portion and the seat back portion of the seating portion, or may have a structure that covers only the seat back portion. The shape, structure, and size of the shell portion can have various forms.

According to the first aspect of the present disclosure, the shell portion is moved by the moving mechanism in the comfort mode, resulting in increasing the height in the seating height direction of the occupant relative to the seat cushion portion. Therefore, the shell portion can be located to cover a head of the occupant. On the other hand, the shell portion is not moved by the moving mechanism in the normal mode. Accordingly, the height of the shell portion relative to the seat cushion portion is low, and thus it is possible to ensure a relatively large gap between the shell portion and the ceiling of the vehicle.

In a second aspect of the present disclosure according to the first aspect, the moving mechanism includes a first reclining mechanism capable of changing a reclining angle of the seat back portion of the seating portion and a second reclining mechanism capable of changing the reclining angle of the shell portion relative to the seat back portion and the seat cushion portion, and a rotational center of the seat back portion in the first reclining mechanism is provided at a position closer to a hip point of a seated occupant than a rotational center of the shell portion in the second reclining mechanism.

According to the second aspect of the present disclosure, the seat back portion and the shell portion of the seating portion can be adjusted in the reclining angle by the first and second reclining mechanisms. At this time, the rotational center in the first reclining mechanism is located closer to the hip point of the occupant. Therefore, when the reclining angle of the seat back portion of the seating portion is adjusted, a relative position between the occupant' back and the seating surface of the seat back portion is small in shift. Accordingly, it is possible to suppress the discomfort of the occupant caused by the shift of the relative position between the occupant's back and the seating surface of the seat back portion.

In a third aspect of the present disclosure according to the second aspect, the rotational center of the shell portion in the second reclining mechanism is provided at a rear position lower than the rotational center of the seat back portion in the first reclining mechanism.

According to the third aspect of the present disclosure, the rotational center of the shell portion is located at the rear lower than the rotational center of the seat back portion in the first reclining mechanism. Therefore, when the seating portion and the shell portion is in the comfort mode compared to the normal mode, the shell portion can be shifted upward relative to the seating portion and the occupant and be located to cover the head of the occupant. That is, according to the third aspect of the present disclosure, it is possible to move the height of the shell portion only by selection of the position of the rotational center using the second reclining mechanism.

In a fourth aspect of the present disclosure according to any one of the first to third aspects, the shell portion includes a side portion that covers at least a part of a head side of the seated occupant in a comfort mode.

In the fourth aspect of the present disclosure, the side portion can be configured to cover right and left sides of the head of the seated occupant. In addition, the side portion can be configured to cover either of the right and left sides of the head of the seated occupant. The side portion can be configured to cover the whole of the head side of the seated occupant. The side portion can be configured to cover only a part of the head side of the seated occupant.

According to the fourth aspect of the present disclosure, the head side of the occupant is covered by the side portion of the shell portion in the comfort mode. Therefore, it is possible to block the occupant at least partially and increase a personal aesthesis.

In a fifth aspect of the present disclosure according to any one of the first to fourth aspects, the shell portion has a lower part larger in a lateral width than an upper part thereof with respect to the height of the seated occupant in the seating height direction.

According to the fifth aspect of the present disclosure, in a case of the comfort mode compared to the normal mode, the height of the shell portion is higher than that of the occupant, and the lower part having the wider width of the shell portion moves upward. Therefore, in the comfort mode, the occupant is located in the wide region of the shell portion and the occupant can take a comfortably relaxed posture.

In a sixth aspect of the present disclosure according to any one of the first to fifth aspects, the seat back portion of the seating portion has a lower part gradually wider in the lateral width than an upper part thereof with respect to the height of the seated occupant in the seating height direction, the shell portion includes an elastic body that has a soft tactile feeling when the occupant comes in contact with a site facing the seated occupant, the elastic body is formed with a notch portion so as to correspond to an outer shape of the seat back portion, the seat back portion is fitted into the notch portion when the seat back portion and the shell portion of the seating portion are located to overlap each other in a longitudinal direction, and an occupant-side surface of the seat back portion and an occupant-side surface of the elastic body are formed along one continuous surface.

According to the sixth aspect of the present disclosure, in a case of the comfort mode compared to the normal mode, the height of the shell portion is higher than that of the seat back portion of the seating portion, and at that time, the seat back portion moves relatively downward in the notch portion of the shell portion when the seat back portion and the shell portion of the seating portion are located to overlap each other in the longitudinal direction. Moreover, since the occupant-side surface of the seat back portion and the occupant-side surface of the elastic body are formed along one continuous surface, the occupant is supported by the occupant-side surface of the seat back portion and the occupant-side surface of the elastic body even when a gap is generated between an outline of the seat back portion and an inner edge of the notch portion of the shell portion. Accordingly, the shell portion smoothly moves to the seat back portion, and sitting comfort of the occupant is also excellently maintained.

While specific embodiments have been described, the invention is not limited to the exteriors and configurations, and various modifications, additions and deletions can be made within the scope that does not change the gist of the present disclosure.

What is claimed is:
1. A vehicle seat comprising:
a seating portion including a seat cushion portion and a seat back portion;
a shell portion configured to cover the seating portion from a rear side; and
a moving mechanism that is configured to change a reclining angle, which is an angle of the seat back portion of the seating portion relative to the seat cushion portion, together with a position of the shell portion to be in two or more modes including a normal mode and a comfort mode, wherein
the moving mechanism is configured to change a distance between a topmost portion of the seat back portion and a topmost portion of the shell portion to be larger in the comfort mode than in the normal mode, when the shell portion is in the normal mode, the reclining angle of the seat back portion is less than the reclining angle of the seat back portion while the shell portion is in the comfort mode, when the shell portion is in the normal mode, a rear tilt angle of the shell portion is less than a rear tilt angle of the shell portion while the shell portion is in the comfort mode, and when the shell portion is moved from the normal mode to the comfort mode, the shell portion is rotated to recline rearwardly relative to the seat cushion portion.

2. The vehicle seat according to claim 1, wherein the moving mechanism includes:
   a first reclining mechanism that changes a reclining angle of the seat back portion of the seating portion; and
   a second reclining mechanism that changes a reclining angle of the shell portion with respect to the seat back portion and the seat cushion portion, and
a rotational center of the seat back portion in the first reclining mechanism is provided at a position higher than a rotational center of the shell portion in the second reclining mechanism.

3. The vehicle seat according to claim 2, wherein the rotational center of the shell portion in the second reclining mechanism is provided at a rear position lower than the rotational center of the seat back portion in the first reclining mechanism.

4. The vehicle seat according to claim 1, wherein the shell portion includes a side portion that covers a side of the seat back portion in a comfort mode.

5. The vehicle seat according to claim 1, wherein the shell portion has a lower part larger in a lateral width than an upper part thereof.

6. The vehicle seat according to claim 1, wherein the seat back portion of the seating portion has a lower part gradually wider in the lateral width than an upper part thereof,
the shell portion includes an elastic body,
the elastic body includes a notch portion having a shape corresponding to an outer peripheral shape of the seat back portion,
the seat back portion is fitted into the notch portion when the seat back portion and the shell portion of the seating portion are located to overlap each other in a longitudinal direction, and
a side surface of the seat back portion and a side surface of the elastic body are configured to have one continuous surface.

7. The vehicle seat according to claim 1, wherein when the seat back portion and the shell portion are moved from the normal mode to the comfort mode, both the seat back portion and the shell portion are rotated rearwardly relative to the seat cushion portion.

* * * * *